United States Patent Office 2,999,930
Patented Sept. 12, 1961

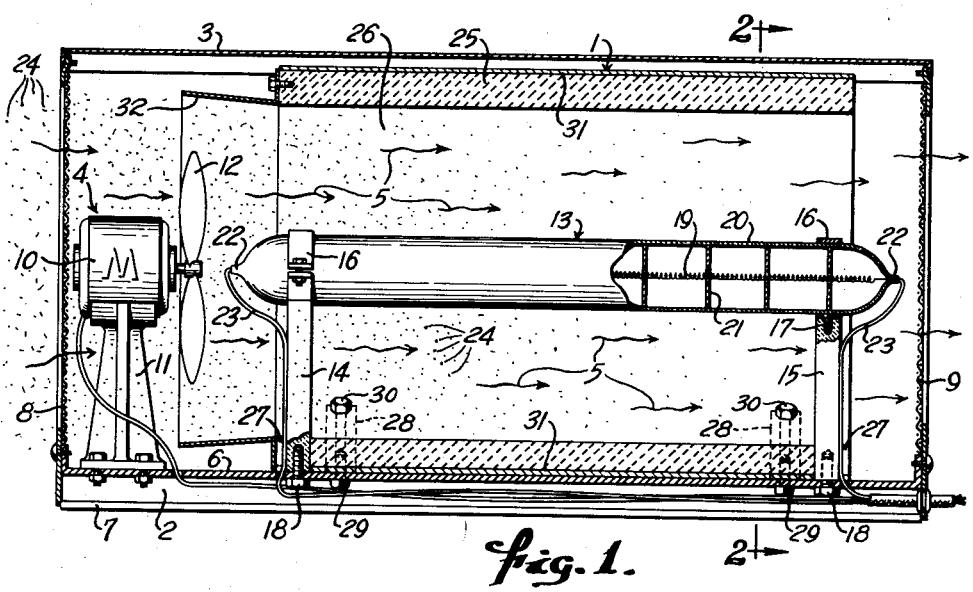
fig. 1.
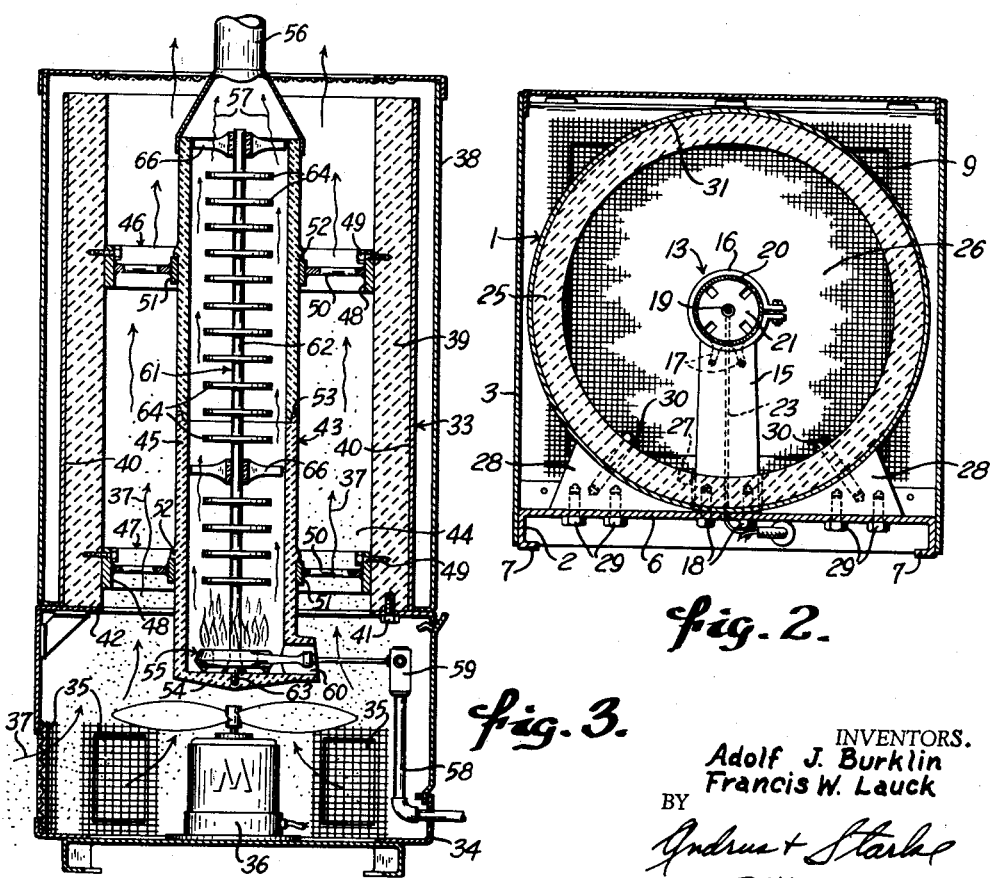
fig. 2.
fig. 3.
INVENTORS.
Adolf J. Burklin
Francis W. Lauck
BY
Attorneys

2,999,930
RADIANT ENERGY PURIFIER
Adolf J. Burklin and Francis W. Lauck, Milwaukee, Wis., assignors to A. O. Smith Corporation, Milwaukee, Wis., a corporation of New York
Filed May 26, 1959, Ser. No. 815,981
2 Claims. (Cl. 250—46)

This invention relates to a radiant energy purifier for gaseous medium and is particularly directed to an apparatus for removing dust and similar combustible particles from air.

Various methods have been proposed for removing dust and the like from air in order to eliminate nasal irritation and the like. One of the methods proposed passes the airborne dust through a radiant energy field where the dust and similar particles are destroyed by incineration.

The incineration of thermal destruction of dust has the particular advantage of eliminating filters which need periodic replacement or cleaning.

In conventional radiant energy purifiers, the dust laden air is moved directly over a suitable heating element. Although this serves to burn the combustible matter in the air, the air temperature is substantially increased and subsequent cooling is required prior to discharging of the air into the dwelling. A great portion of the input heat energy is lost in heating the air and the subsequent cooling of the treated air represents an additional energy loss.

The radiant energy passes through the dust laden air and is partially dissipated in the burning of dust particles. However, that portion of the radiant energy which does not encounter any dust particles and the like is lost.

Consequently, conventional units are relatively inefficient and expensive to operate. Further, they must be relatively large to accommodate the necessary air volume for a conventional dwelling and the like. The initial cost of such apparatus is therefore also relatively high and not readily adapted to conventional homes and the like.

In accordance with the present invention, an air passage chamber is provided having a radiant energy generator mounted internally of the chamber. Suitable reflecting surface are provided to reflect the radiant energy back and forth between the walls of the chamber to thereby establish a uniform radiant energy field within the chamber. The radiation heat losses are substantially reduced and essentially all of the radiant energy is available for destruction of dust particles and the like.

In accordance with another aspect of the present invention, the internal radiant energy generator is separately enclosed within a housing to prevent direct contact of the air with the heating element. The enclosure is formed of a low radiant energy absorbing material to allow ready passage of the radiant energy through the enclosure and into the chamber. Further, the enclosure is spaced from the radiant generator to substantially reduce heat transmission to the air by convection or conduction.

The present invention provides a very efficient, radiant energy purifier. The unit may be relatively small and therefore adapted for installation in conventional homes. The initial and operation cost of the purifier of the invention are relatively low.

The drawings furnished herewith illustrates the best mode presently contemplated for carrying out the invention.

In the drawing:

FIG. 1 is a cross sectional view of an air purification apparatus constructed in accordance with the present invention.

FIG. 2 is a cross sectional view taken on line 2—2 of FIG. 1; and

FIG. 3 is a view similar to FIG. 1 with a gas burner as the source of heat.

Referring to the drawings and particularly to FIGS. 1 and 2, an air purifier constructed in accordance with the present invention is illustrated generally comprising a tubular radiant energy purifier 1 mounted upon a base 2 which constitutes a part of an outer decorative sheet casing 3. A fan 4 is mounted within the sheet metal casing 3 generally in axial alignment with the tubular radiant energy purifier 1. A flow of air 5 is established through the radiant energy purifier 1 incident to energization of fan 4 to remove combustible matter from the air, as subsequently described.

The base 2 is a generally channel shaped member having a laterally extending web portion 6 and integral depending legs turned inwardly to form supporting portions 7. The base 2 is formed of any suitable material adapted to support the weight of the radiant energy purifier 1 and the fan 4.

The outer casing 3 is of the conventional sheet metal decorative covering which covers the purifier 1 and is welded or otherwise secured to the base 2. A front screen 8 closes the incoming air end of the casing 3 to prevent relatively large particles from being drawn into the casing. Similarly a screen 9 is secured to the discharge end of the casing 3 to prevent entrance of large particles and foreign matter.

The fan 4 is shown as a conventional axial flow fan including a drive motor 10 which is secured by suitable mounting pedestal 11 to the base 2. A fan blade 12 is secured to the shaft of motor 10 and establishes the flow of air 5 incident to energization of motor 10.

The radiant energy purifier 1 generally includes an electric heating unit 13 which is centrally mounted within the purifier 1 upon the base structure 2 by a front pedestal 14 and a rear pedestal 15 of suitable heat resistant material. The pedestals 14 and 15 are similarly constructed and attached to the base structure 2 and pedestal 15 is referred to for purposes of description.

A C-type clamp 16 encircles the adjacent end of the heating unit 13 and is secured by screws 17 to upper end of pedestal 14. Suitable bolts 18 pass upwardly through the base 2 and thread into correspondingly threaded openings in the pedestal 14 to rigidly attach the pedestal to the base 2 with the heating unit 13 in generally axial alignment with the fan 4. The illustrated heating unit 13 is of a standard construction and includes a high resistant coil 19 mounted coaxially within a housing 20 which extends axially of the casing 3. The heating coil 19 is of any conventional high resistant material adapted to establish a high heat energy output generally of a infra-red radiation variety incident to high voltage energization. Suitable heat insulating spacers 21 are provided throughout the length of the tubular housing 20 to coaxially secure the coil 19 within the housing 20 in spaced relation to the housing wall. The opposite ends of the housing 20 are pinched and sealed, as at 22, about suitable leads 23 extending from opposite ends of the coil. The leads 23 extend down adjacent the pedestals 14 and 15 and are extended outwardly of the unit for electrical connection to any suitable high voltage, low current source.

The housing 20 is evacuated prior to establishment of the end seals 22 to establish a vacuum about the coil 18. The vacuum provides a ready path for the transmission of radiant energy. However, convection and conductive heat which requires mass flow is essentially eliminated.

The housing 20 is formed of any material which readily passes radiant energy. That is, the material is a low absorber of radiant energy. Transparent fuse quartz and aluminum oxide provide excellent enclosures for the heating coil 19.

The energization of coil 19 establishes an intense radiant energy field extending radially outwardly of the heating unit 13 and into the path of the air 5. Dust particles 24 in the air 5 are normally made up of various combustible matter which constitute good absorbers of radiant energy. Therefore, if the particles 24 encounter radiant energy, they are rapidly burned and destroyed.

The temperature of the air 5 as it passes over the heating unit 13 is slightly increased by convection and conduction adjacent the housing 20. The housing 20 absorbs a very small portion of the radiant energy emitted from coil 19 and is slightly heated by the coil 19 even through held in spaced relation to the heating coil.

However, the amount of heating is low and the housing is maintained at a relatively low temperature. Further, the elongated housing 18 establishes a relatively small surface contact area. Radiant energy does not heat the air and consequently there is very little heating of the air.

A tubular shield 25 is coaxially secured about the heating element 13 to establish an annular air passage 26 for the air 5. The shield 25 extends substantially co-extensively of the heating element 13 and includes slots 27 in the ends of the base portion to accommodate the pedestals 14 and 15. Mounting brackets 28 are bolted as to the base 2 as by bolts 29 and to the shield 25 by bolts 30 to rigidly secure the shield 25 in position.

A reflecting surface 31, shown substantially enlarged for clarity of illustration, is deposited upon the outer surface of the shield 25. The reflecting surface 31 is formed of any suitable material which readily reflects radiant energy back into the shield 25. Silver is particularly effective as a reflecting surface.

The shield 25 is formed of a low radiant energy absorber such as transparent fuse quartz or aluminum oxide and allows ready transfer of the radiant energy to and from the reflecting surface 31. Consequently, a generally uniform and high intensity radiant energy field is created within the annular air space 26 and the dust particles 24 which pass through this annular passage are subjected to the high intensity radiant energy field.

A tubular sheet-metal shroud 32 is bolted to the entrance end of the shield 25 and extends forwardly over the fan blades 12 to direct the incoming air into the annular passage 26.

The operation of the invention illustrated in FIGS. 1 and 2 is summarized as follows:

The fan 4 and the heating element 13 are energized to simultaneously establish the flow of air 5 and to establish a high intensity radiant field in the annular passage 26.

The radiant element 13 establishes radiant energy which travels radially from the coil 19 toward the shield 25. The energy travels radially through the element housing 20, the annular passage 26 and the shield 25 to the reflecting surface 31. The radiant energy is reflected back into the shield 25 by the surface 31 and available to destroy the dust particles 24. A small portion of the radiant energy is given up to the housing 20 and to the shield 25. However, the quantity lost is relatively small and the greater portion of the radiant energy continues to pass radially back and forth through the annular passage 26.

If the radiant energy encounters a dust particle 24, the radiant energy is absorbed and the particle destroyed and removed by combustion.

The air passing through the annular passage 26 is not appreciably heated. The only heat transferred thereto is the heat absorbed by convection of the air which touches the inner surface of the shield 25 and the outer surface of the element housing 20. As previously noted, the shield 25 and housing 19 are relatively low energy absorbers and do not appreciably increase in temperature. The heat of combustion of the dust particles 24 is transmitted to the air and also increases the air temperature.

Therefore, it is normally desirable to provide a suitable air cooling means, not shown, connected to the discharge end of the annular passage 26. Because the air temperature increases only slightly, a relatively small and inexpensive cooling device can be employed.

Referring particularly to FIG. 3 in the drawings, an alternative embodiment is shown employing a gas burner as the initial source of heat in place of the electric element as shown in FIGS. 1 and 2.

Referring particularly to FIG. 3, a gas fired incinerator 33 is vertically supported upon a cup-shaped support 34 having a plurality of screened openings 35 to allow the entrance of air into the support. A fan 36, similar to fan 4, is coaxially mounted upon the bottom wall of the annular support 34 and draws air 37 through the openings 35 and forces it upwardly through the gas fired incinerator 33. A decorative housing 38 is illustrated to enclose the gas fired incinerator 33.

The gas fired incinerator 33 generally includes an outer shield 39 of a low radiant energy absorbing material and a reflecting surface 40, as in the electrically energized unit of FIGS. 1 and 2. A plurality of bolts 41 rigidly secure the outer shield 39 to a radially inwardly projected lip 42 on the upper edge of support 34. A gas fired, radiant energy emitting element 43 is coaxially secured within the shield 39 to establish a radiant energy field within an annular passage 44 established therebetween.

The heating element 43 includes a tubular housing 45 formed of a low radiant energy absorbing material similar to housing 20 of FIGS. 1 and 2. The housing 45 is coaxially secured within the shield 39 by a pair of vertically spaced brackets 46 and 47. Each of the brackets 46 and 47 include an outer ring 48 which is bolted to the shield 39 by bolts 49. Radial arms 50 secure inner housing support rings 51 to the ring 48. Rings 51 slidably receive the housing 45 which is provided with encircling projections 52 on the outer periphery which rest upon the rings 51 to support housing 45 within the shield 39. The housing 45 is split as at 53 to permit assembly with the brackets 46 and 47.

The lower end of the housing 45 is closed by a bottom wall 54 and a gas burner 55 is mounted thereon. A chimney 56 is secured to the upper end of the housing 45 and extends upwardly from the casing 38 to a suitable discharge location, not shown, for flue gases 57 which are generated from the gas fired burner 55.

The burner 55 is a conventional annular member connected to an incoming gas line 58 through a suitable control 59. An opening 60 in the lower side wall of housing 45 is provided for the connection of the burner 55. A pilot burner, not shown, may be provided for automatic igniting of the burner 55.

The burner 55 is adapted to heat the adjacent air which rises upwardly through the housing 45 and chimney 56. A radiant energy emitter 61 is coaxially secured within the chimney section 45 and is heated by the heated air to establish a radiant energy source.

The emitter 61 generaly comprises a central rod 62 which is secured to the bottom wall 54 of housing 45 by a threaded projection 63. A plurality of plate members 64 are secured to the rod 62 in vertically spaced relation. Insulating spacing supports 66 are secured to the rod 62 intermediate certain of the plate members 64 to radially reinforce emitter 61.

The embodiment of FIG. 3 generally functions in a manner corresponding to the operation of the unit shown in FIGS. 1 and 2. Thus, the gas burner 55 is fired and establishes a heat source to increase the temperature of plate members 64 to a relatively high temperature. The plate members 64 then emit high intensity radiant energy which travels radially outwardly through the housing 45.

The reflecting surface 40 prevents the escape or loss of the radiant energy and thus establishes uniform, high intensity field in the annular passage 44 between the outer tubular shield 39 and the housing 45.

The air 37 forced upwardly through the annular passage 44 by fan 36 is subjected to the radiant energy and any dust particles are rapidly thermally destroyed by the absorption of the radiant energy.

The present invention thus provides an efficient radiant energy air purifier which is relatively low in initial cost and maintenance.

Various modes of carrying out the invention are contemplated as being within the scope of the following claims particularly pointing out and distinctly claiming the subject matter which is regarded as the invention.

We claim:

1. Apparatus for thermal treatment of dust particles in air without substantial heating of the air, and in which the air flows through a passage between opposed walls of material substantially transparent to radiant heat energy, a source of radiant heat energy behind one of said walls to apply radiant heat to the entire area within said passage, and a radiant energy reflector behind the opposite of said walls and coextensive therewith to increase the radiant energy treatment of the dust particles in the flowing air, said transparent material shielding the air from heat conduction from said source and said reflector.

2. The apparatus of claim 1 in which the opposed walls are concentric tubular elements, the radiant heat source is disposed centrally of the inner wall, and the radiant heat reflector is disposed immediately outside the outer wall.

References Cited in the file of this patent

UNITED STATES PATENTS

| | | |
|---|---|---|
| 2,211,812 | Colbert | Aug. 20, 1940 |
| 2,501,290 | Pequignot | Mar. 21, 1950 |
| 2,529,625 | Katz | Nov. 14, 1950 |
| 2,638,644 | Rauhut | May 19, 1953 |
| 2,855,494 | Kuebler | Oct. 7, 1958 |